United States Patent
Lee (10) Patent No.: US 10,546,391 B2
(45) Date of Patent: Jan. 28, 2020

(54) APPARATUS AND METHOD FOR GENERATING AROUND VIEW

(71) Applicant: HYUNDAI MOBIS CO., LTD., Yongin-si (KR)

(72) Inventor: Seong Soo Lee, Jincheon-gun (KR)

(73) Assignee: Hyundai Mobis Co., Ltd., Yongin-si, Gyeonggi-Do (KR)

( * ) Notice: Subject to any disclaimer, the term of this patent is extended or adjusted under 35 U.S.C. 154(b) by 281 days.

(21) Appl. No.: 15/638,165

(22) Filed: Jun. 29, 2017

(65) Prior Publication Data

US 2018/0025508 A1    Jan. 25, 2018

(30) Foreign Application Priority Data

Jul. 25, 2016    (KR) .................. 10-2016-0094028

(51) Int. Cl.
*H04N 7/18*        (2006.01)
*G06T 7/80*        (2017.01)

(52) U.S. Cl.
CPC ............... *G06T 7/85* (2017.01); *H04N 7/181* (2013.01); *B60R 2300/105* (2013.01); *B60R 2300/303* (2013.01); *B60R 2300/8026* (2013.01); *B60R 2300/8066* (2013.01)

(58) Field of Classification Search
CPC .... G06T 7/85; G06T 7/73; G06T 3/00; G06T 2207/30256; G06T 2207/30244; H04N 7/181; B60R 2300/8066; B60R 2300/8026; B60R 2300/303; B60R 2300/105

See application file for complete search history.

(56) References Cited

U.S. PATENT DOCUMENTS

2010/0226544 A1*   9/2010   Uchida ................ B60R 1/00
                                                       382/107

OTHER PUBLICATIONS

Davide Scaramuzza and Roland Siegwart, "Appearance-Guided Monocular Omnidirectional Visual Odometry for Outdoor Ground Vehicles", IEEE Transactions on Robotics, vol. 24, No. 5, Oct. 2008. (Year: 2008).*
Shigang Li, "Monitoring Around a Vehicle by a Spherical Image Sensor", IEEE Transactions on Intelligent Systems, vol. 7, No. 4, Dec. 2006. (Year: 2006).*

* cited by examiner

*Primary Examiner* — Siamak Harandi
(74) *Attorney, Agent, or Firm* — Knobbe Martens Olson & Bear LLP (57) ABSTRACT

Provided is an apparatus for generating an around view. The apparatus includes a capture unit configured to capture images in front of, behind, to the left of, and to the right of a vehicle using cameras, a mask generation unit configured to set a region ranging a predetermined distance from the vehicle in the captured image as a mask region, a feature point extraction unit configured to extract ground feature points from the mask region of each of the captured images; a camera attitude angle estimation unit configured to generate a rotation matrix including a rotation angle of the camera using the extracted feature points; and an around view generation unit configured to rotationally convert the captured images to a top-view image using the rotation matrix.

6 Claims, 11 Drawing Sheets

FIG. 7A (ORIGINAL IMAGE)

FIG. 7B

TOP-VIEW IMAGE: VIEW SEEN FROM GROUND LEVEL

APPARATUS AND METHOD FOR GENERATING AROUND VIEW

CROSS-REFERENCE TO RELATED APPLICATION

This application claims priority to and the benefit of Korean Patent Application No. 10-2016-0094028, filed on Jul. 25, 2016, the disclosure of which is incorporated herein by reference in its entirety.

BACKGROUND

1. Field of the Invention

The present invention relates to an apparatus and method for generating an around view, and more particularly, to an apparatus and method for correcting a tolerance generated in an around view monitoring system (AVMS).

2. Discussion of Related Art

An around view monitoring system (AVMS) of a vehicle is a system that receives images from four cameras (a front camera, a rear camera, a left camera, and a right camera) installed in the vehicle and shows the vehicle's surroundings from a bird's eye view.

Such an AVMS, which uses images captured by a plurality of cameras, essentially requires that tolerances be corrected when the cameras are assembled therein. To this end, each vehicle manufacturer corrects tolerances for a vehicle equipped with an AVMS to satisfy matching of an around view image and then releases the vehicle.

However, when the vehicle is continuously used after release, the tolerances corrected upon the release are changed due to various environmental factors such as vibration of the vehicle during driving, folding of side mirrors of the vehicle, and opening or closing of a door of the vehicle, and thus matching of an image is deteriorated.

Accordingly, this causes an inconvenience in that the surroundings cannot be accurately recognized because a driver uses a distorted around view image while driving or parking.

To overcome this inconvenience, the changed tolerances should be corrected. However, it is cumbersome to visit a service center or office capable of tolerance correction to correct the tolerances.

Accordingly, there is a need for an AVMS for correcting a tolerance when the tolerance is changed and providing a matching around view image.

In this regard, conventional tolerance correction methods include extracting ground feature points captured using four cameras during driving, re-estimating attitudes of the cameras, and reducing distortion of an around view image due to the attitudes.

However, unlike a service center or office capable of tolerance correction, a ground surface captured during driving is not flat and has a gradient (slope).

Accordingly, ground feature points cannot be extracted from such a captured result or an image corrected using extracted feature points can be rather distorted.

SUMMARY OF THE INVENTION

The present invention is directed to providing an apparatus and method for accurately correcting a tolerance of an around view monitoring system (AVMS) while a vehicle is moving.

The present invention is not limited to the above objectives and other objectives not described herein may be clearly understood by those skilled in the art from descriptions below.

According to an aspect of the present invention, there is provided an apparatus for generating an around view, the apparatus including a capture unit configured to capture images in front of, behind, to the left of, and to the right of a vehicle using a camera; a mask generation unit configured to set a region ranging a predetermined distance from the vehicle in each of the captured images as a mask region; a feature point extraction unit configured to extract ground feature points from the mask region of each of the captured images; a camera attitude angle estimation unit configured to generate a rotation matrix including a rotation angle of the camera using the extracted feature points; and an around view generation unit configured to rotationally convert the captured images to a top-view image using the rotation matrix.

According to another aspect of the present invention, there is provided a method of generating an around view which is performed by an apparatus that includes one or more processors and generates an around view, the method including acquiring images by performing capturing in four directions, i.e., in front of, behind, to a left side of, and to a right side, of a vehicle using a camera; setting a region ranging a predetermined distance from the vehicle in each of the acquired images as a mask region; extracting ground feature points from the mask region; generating a rotation matrix including a rotation angle of the camera using the extracted feature points; and rotationally converting the images captured in the four directions to a top-view image using the rotation matrix.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 5A to FIG. 5D are a diagram showing a mask region generated by an around view generation apparatus according to an embodiment of the present invention;

FIG. 6A to FIG. 6D are a diagram showing a method of generating a virtual traffic line according to another embodiment of the present invention;

FIG. 8A to FIG. 8C are a diagram showing an around view image generated by an around view generation apparatus according to an embodiment of the present invention.

DETAILED DESCRIPTION OF EXEMPLARY EMBODIMENTS

Advantages and features of the present invention and methods of accomplishing the same will be apparent by referring to embodiments described below in detail in connection with the accompanying drawings. However, the invention may be embodied in different forms and is not to be construed as limited to the embodiments set forth herein. Rather, these embodiments are provided so that this disclosure will be thorough and complete and will fully convey the scope of the present invention to those skilled in the art. Therefore, the scope of the invention is defined only by the appended claims. The terminology used herein is for the purpose of describing particular embodiments only and is not intended to limit the example embodiments. As used herein, the singular forms "a," "an," and "the" are intended to include the plural forms as well unless the context clearly indicates otherwise. The terms "comprises" and/or "comprising," when used in this specification, specify the presence of stated elements, steps, operations, and/or components, but do not preclude the presence or addition of one or more other elements, steps, operations, and/or components.

Hereinafter, exemplary embodiments of the present invention will be described in detail with reference to the accompanying drawings.

Figure 1:
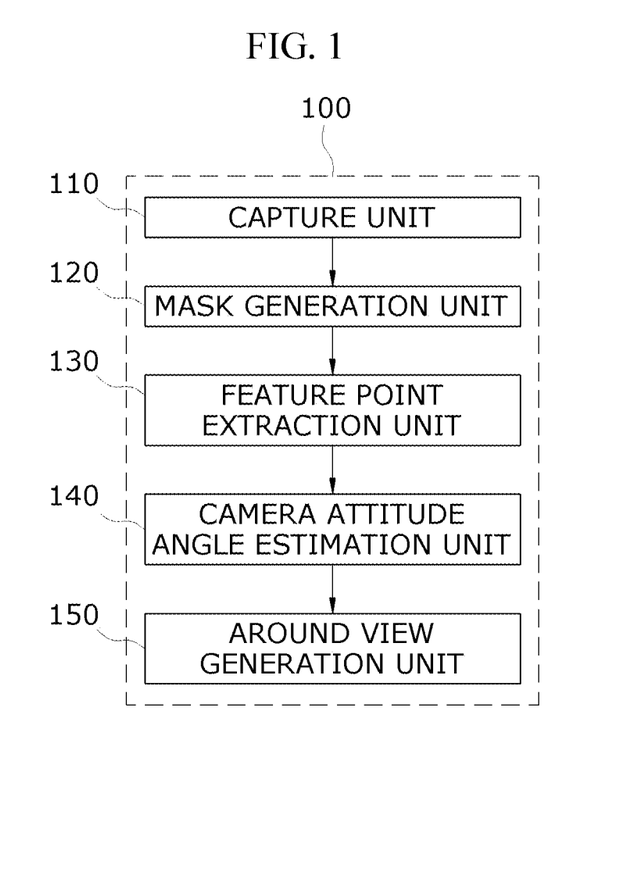
FIG. 1 is a block diagram showing an around view generation apparatus according to an embodiment of the present invention.

FIG. 1 is a block diagram showing an around view generation apparatus according to an embodiment of the present invention.

An around view generation apparatus 100 includes a capture unit 110, a mask generation unit 120, a feature point extraction unit 130, a camera attitude angle estimation unit 140, and an around view generation unit 150.

The capture unit 110 includes cameras configured to perform capturing in four directions, i.e., a front direction, a rear direction, a left direction, and a right direction.

Figure 2A:
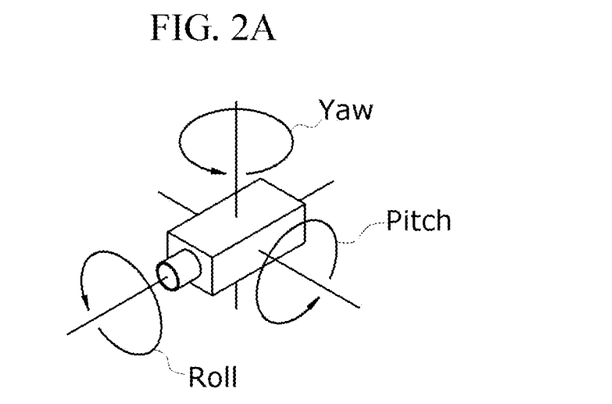
FIG. 2A is a diagram showing image capture unit according to an embodiment of the present invention.
Figure 2B:
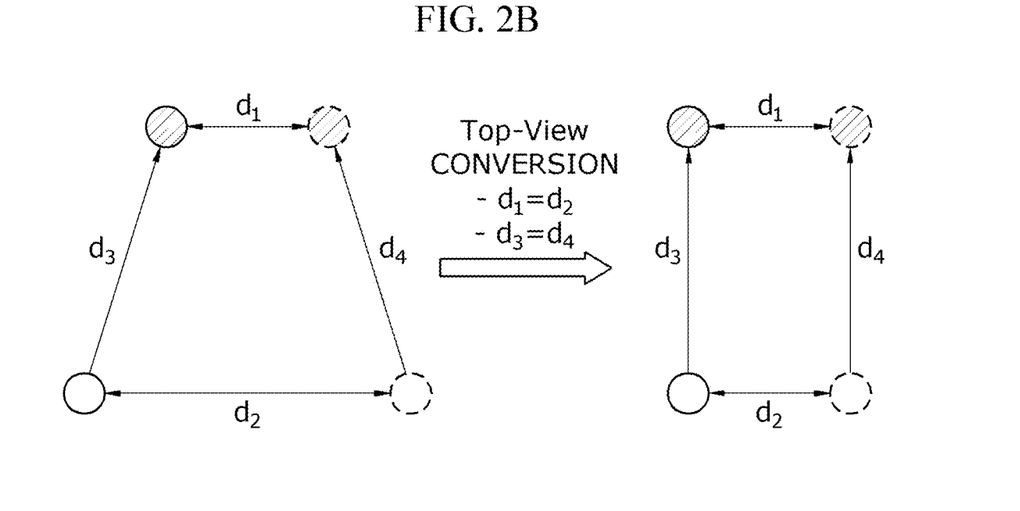
FIG. 2B is a diagram showing a method of converting image captured by an image capture unit as shown in FIG. 2A into a top-view image according to an embodiment of the present invention.
Figure 3A:
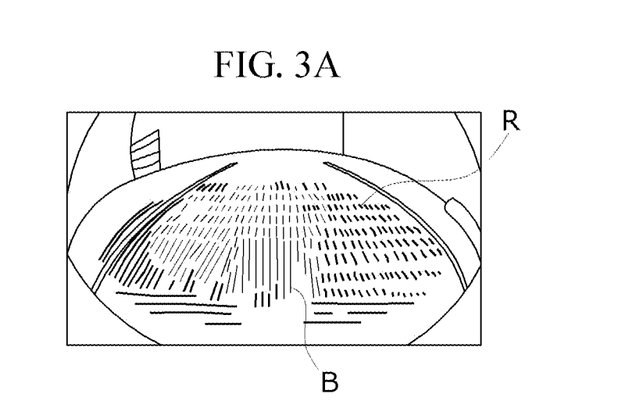
FIGS. 3A, 3B, 3C and 3D are diagrams showing feature points extracted from a captured image.
Figure 3B:
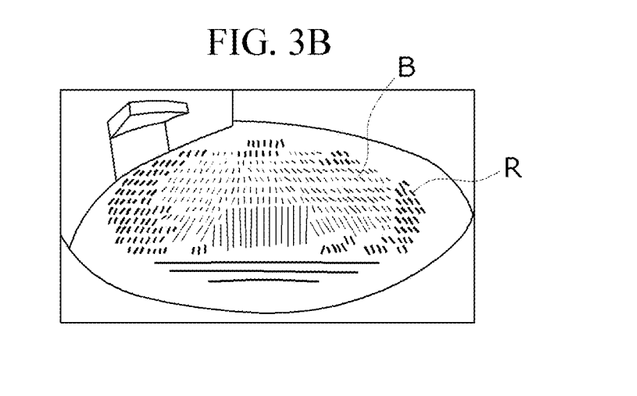
Figure 3C:
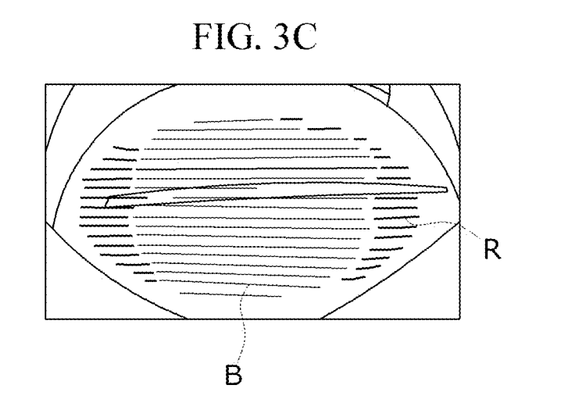
Figure 3D:
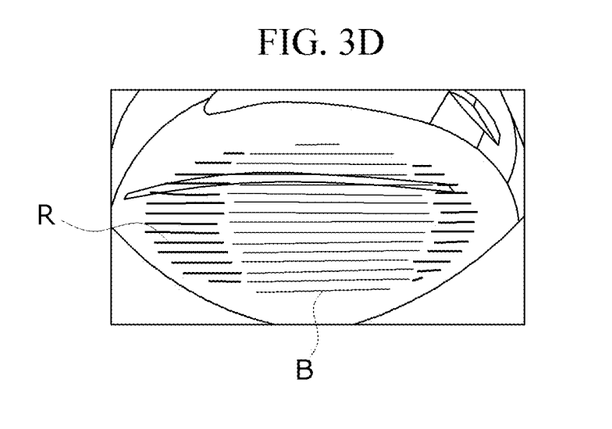

Since the cameras included in the capture unit 110 are not perpendicular to a ground surface, captured images are as shown in left drawing of FIG. 2B. Accordingly, images that seems to be captured while the cameras are perpendicular to the ground surface may be obtained through a top-view conversion, as shown in right drawing of FIG. 2B.

The mask generation unit 120 generates a mask for determining a region from which feature points are to be extracted in each of a front image, a rear image, a left image, and a right image captured by the capture unit 110.

FIG. 3A to FIG. 3D are shows an example result of extracting feature points from most regions of a road that is shown in an image without generating a mask for extracting feature points. A red dots (R) indicate positions of feature points of a preceding image, and a blue lines (B) indicate motion vectors of the feature points in a current image.

Feature points refer to common points that may represent features of a ground surface in images that are continuously captured.

Feature points may be detected by extracting the feature points from continuous images on the basis of an optical flow and performing matching on the extracted feature points. In this case, only ground feature points may be detected by calculating a homography (a 3×3 matrix) indicating a correspondence between the ground feature points.

As shown in FIG. 3A to FIG. 3D, when feature points are extracted from most regions of the ground surface, a target region is widened and the possibility that feature points will be extracted increases.

Figure 4:
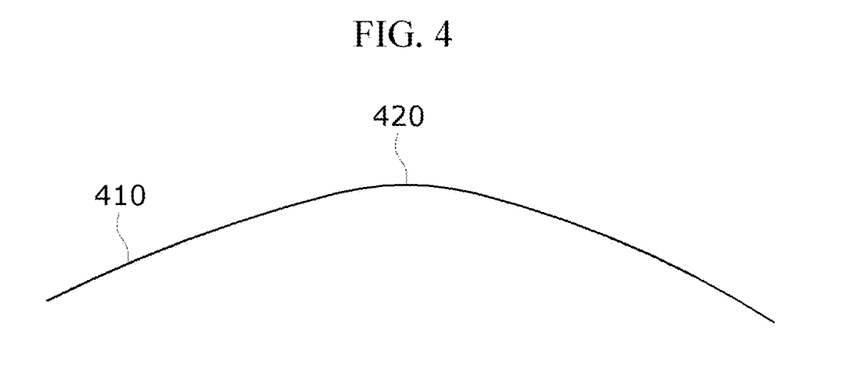
FIG. 4 is a diagram showing a cross-sectional structure of a road having a slope.

However, an actual road 410 is not a perfectly flat surface, unlike a release test site or a service center of each vehicle maker, and also has a centerline portion 420 with a high slope as shown in FIG. 4. Thus, feature points being extracted from all regions and an attitude angle of a camera being estimated from the feature points may hinder matching of an around view image.

Accordingly, when a feature point extraction region is limited to a certain region around a vehicle as shown in FIG. 5A to FIG. 5D, it is possible to reduce a tolerance correction error due to a road slope.

The mask generation unit 120 generates masks 510 to 540 for extracting feature points which are limited to a region around the vehicle.

When a mask region is small, there is an advantage in that an influence of a road slope thereon is small. However, when a mask region is too small, feature points may not be extracted. Accordingly, an optimal region may be predetermined by repeating experiments.

As an example of setting a mask region, a traffic line may be used as a boundary thereof.

A region outside the traffic line is a region where a vehicle traveling in the same direction or a vehicle traveling on an opposite lane may be present at any time. Accordingly, when a ground surface is not shown in the image but another vehicle is shown, a problem of the ground feature points not being extracted may occur.

Accordingly, the problem may be solved by limiting the mask region to a lane in which the vehicle is traveling so that an influence of a vehicle traveling in another lane is reduced.

In order to set the mask region, traffic lines 550 and 560 are detected from left and right images, and a space between the vehicle and the traffic lines 550 and 560 is set as the mask region for extracting feature points.

The traffic lines 550 and 560 may be detected using a difference in color or brightness between the ground surface and the traffic lines 550 and 560 that are represented in white or yellow or using various other detection methods.

Since front and rear boundaries cannot be set in front and rear images of the vehicle on the basis of a traffic line, a method of finding a distance between the vehicle and the traffic lines from the left and right images, generating virtual lines 570 and 580 at a position spaced the found distance from the front and rear side of the vehicle, and finding a mask from the virtual lines 570 and 580 may be used.

Figure 5A:
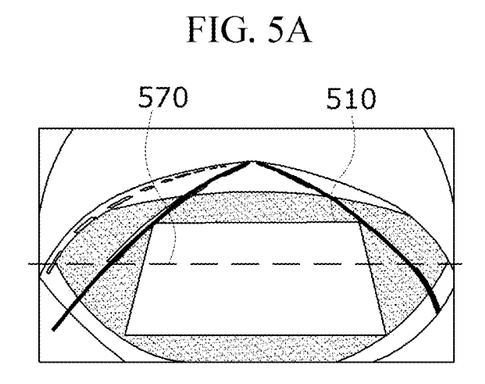
Figure 5B:
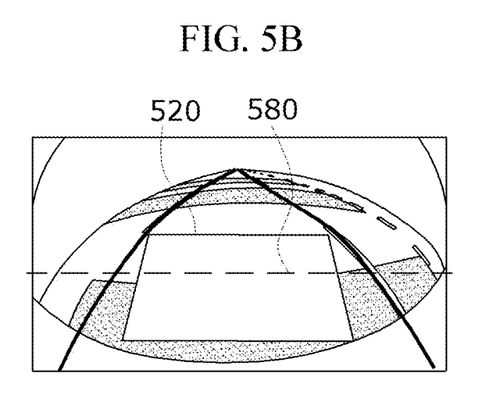
Figure 5C:
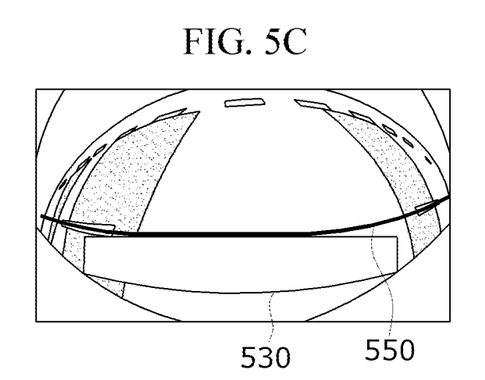
Figure 5D:
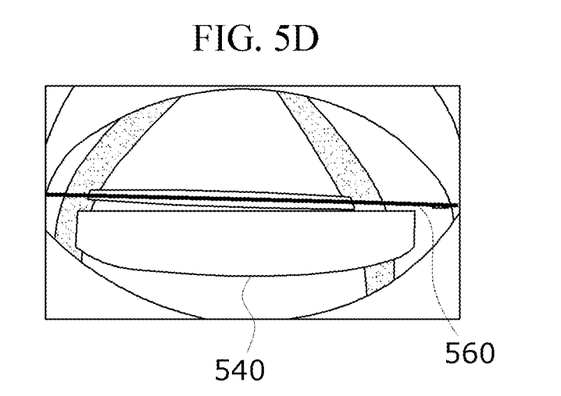
Figure 6A:
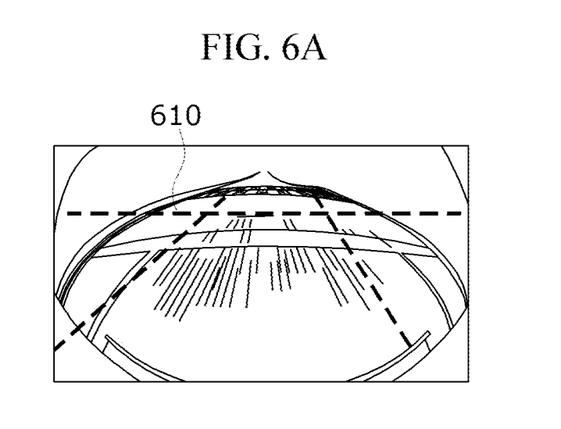
Figure 6B:
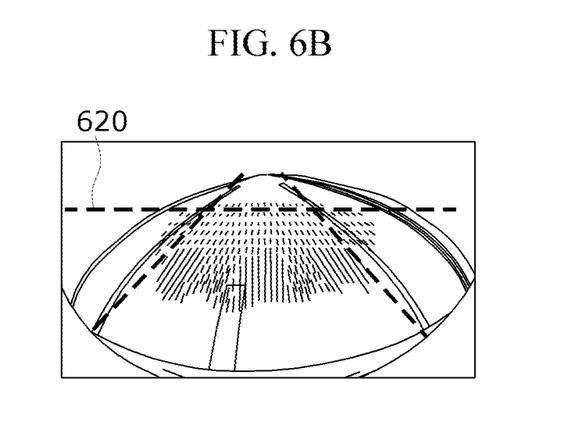
Figure 6C:
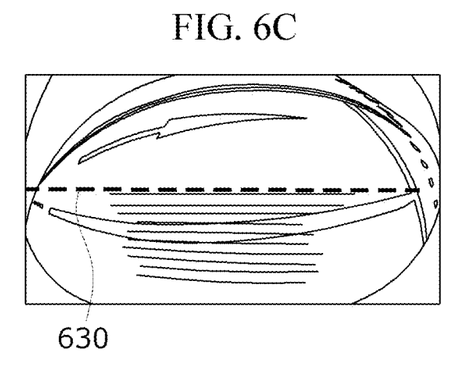
Figure 6D:
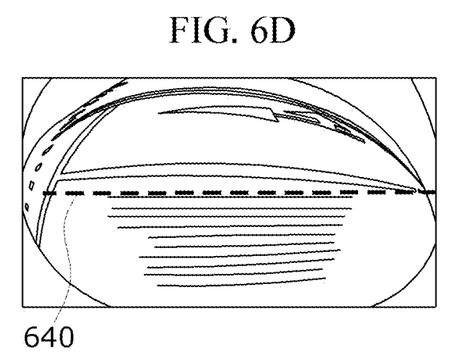

The front and the rear of the vehicle are less affected by a slope than left and right sides of the vehicle. Accordingly, there is an advantage in extracting feature points when a region that is wider than left and right mask regions 530 and 540 is set as the mask region.

FIG. 6A to FIG. 6D are shows an image from which feature points are extracted by a mask region setting method that is used when a road does not have traffic lines or when a traffic line is not detected in a captured image.

When a traffic line is not detected, virtual traffic lines 630 and 640 may be formed in consideration of a typical road width and a typical vehicle width.

After the virtual traffic lines 630 and 640 are formed, a space between the vehicle and the virtual lines 630 and 640 may be generated as the mask region on the basis of the virtual traffic lines, like in the case of detecting a traffic line in FIG. 5A to FIG. 5D.

The feature point extraction unit 130 extracts feature points from the generated mask region.

The feature point extraction unit 130 may detect feature points on the basis of various detection algorithms. As an example, the feature point extraction unit 130 may detect feature points using a top-hat filter, a Hough transformation algorithm, a RANSAC-based line fitting algorithm, a Kalman filter, etc. However, the present invention is not limited thereto, and various detection methods may be used.

The camera attitude angle estimation unit 140 estimates a camera rotation angle on the basis of a ground surface in order to form the captured images into a top-view-type around view image.

When the camera rotation angle is estimated, the camera attitude angle estimation unit 140 extracts an x-axis rotation angle, a y-axis rotation angle, and a z-axis rotation angle on the basis of the ground surface. In this case, the feature points extracted by the feature point extraction unit 130 are used.

A rotation matrix is used to convert an original image into a top-view image. In order to find the rotation matrix, the camera attitude angle estimation unit 140 estimates the x-axis rotation angle, the y-axis rotation angle, and the z-axis rotation angle on the basis of feature point patterns and generates a rotation matrix including the estimated x-axis rotation angle, y-axis rotation angle, and z-axis rotation angle.

In order to estimate the x-axis rotation angle, the y-axis rotation angle, and the z-axis rotation angle, an x-axis rotation angle, y-axis rotation angle, and z-axis rotation angle that satisfy angle estimation conditions may be pre-learned and prestored in the camera attitude angle estimation unit 140.

That is, the camera attitude angle estimation unit 140 searches for a rotation angle corresponding to an angle estimation condition that is set on the basis of detected feature point patterns. When the rotation angle corresponding to the angle estimation condition is found, the camera attitude angle estimation unit 140 generates the rotation matrix using the corresponding rotation angle.

The pre-learned x-axis rotation angle, y-axis rotation angle, and z-axis rotation angle may be stored in the form of a lookup table in consideration of a storage capacity of the camera attitude angle estimation unit 140. To this end, the camera attitude angle estimation unit 140 may include, for example, a non-volatile memory.

The around view generation unit 150 converts the front, rear, right, and left images captured by the capture unit 110 into a top-view image by using the rotation matrix indicating the estimated attitude angle of the camera.

Figure 7A:
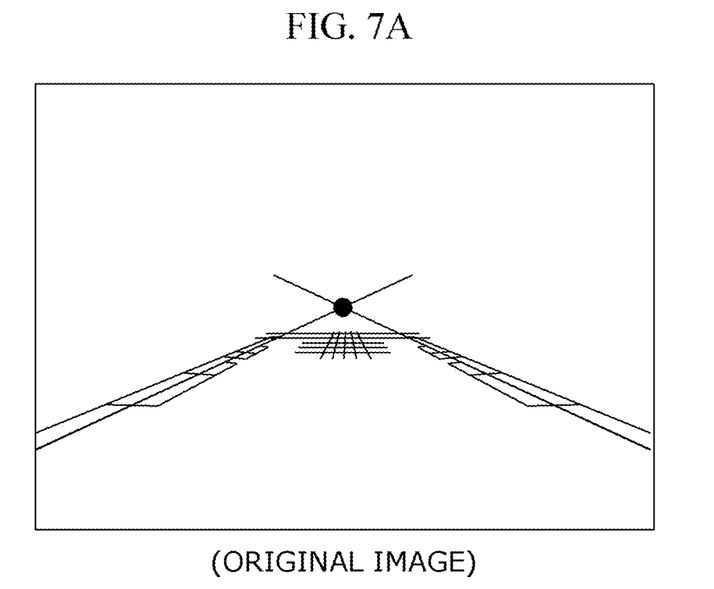
FIG. 7A is a diagram showing an original image that is obliquely captured due to a position of a camera.
Figure 7B:
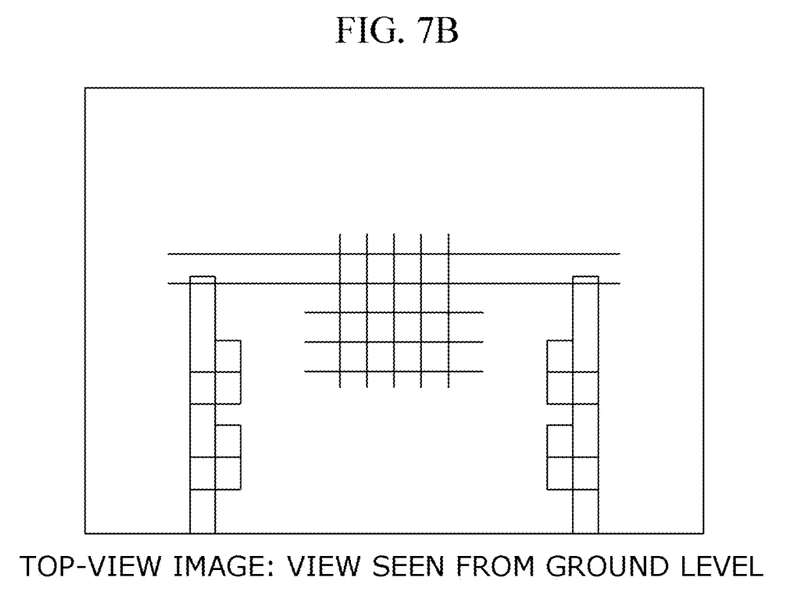
FIG. 7B is a diagram showing may be converted into an image that seems to be perpendicularly captured from the vehicle by the around view generation unit.

An original image that is obliquely captured due to a position of a camera, as shown in FIG. 7A, may be converted into an image that seems to be perpendicularly captured from the vehicle by the around view generation unit 150, as shown in FIG. 7B.

Figure 8A:
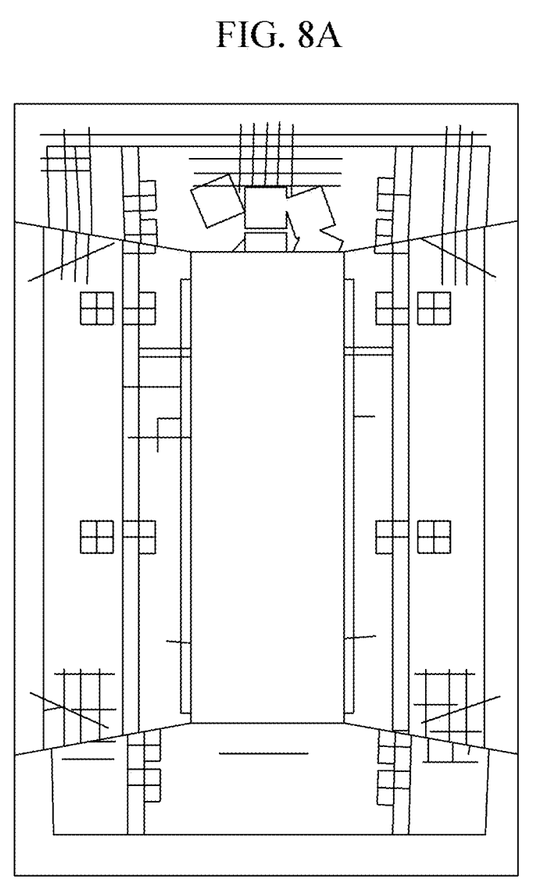
Figure 8B:
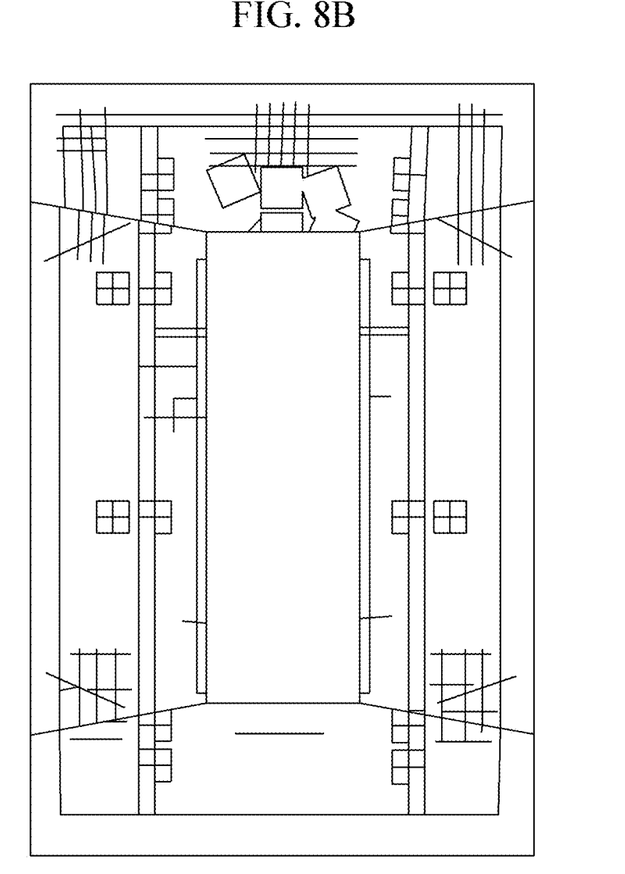
Figure 8C:
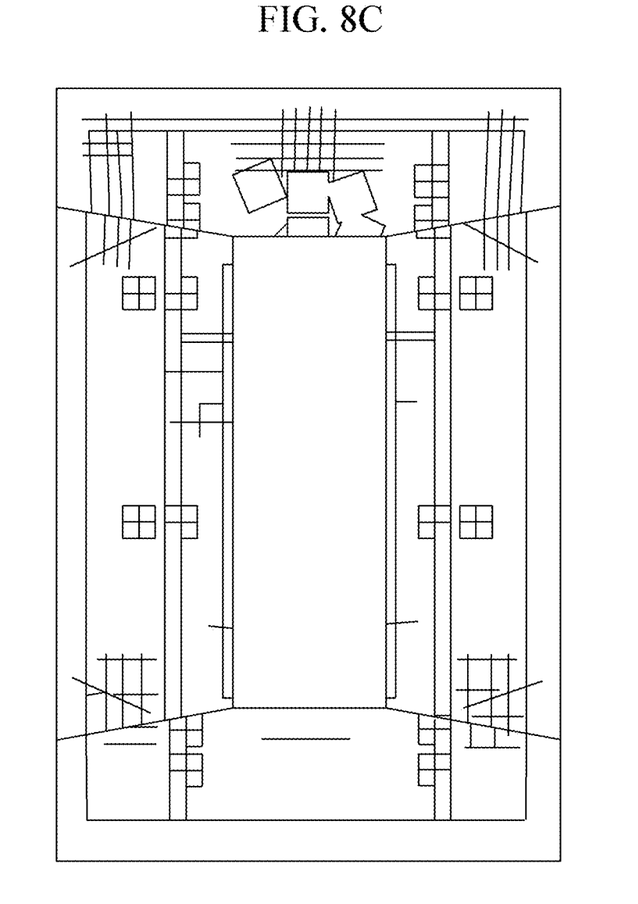

FIG. 8A to FIG. 8C is shows an aspect in which images captured in four directions, i.e., front, rear, left, and right images, are converted into an around view using an attitude angle of a camera.

FIG. 8A represents an around view image obtained by extracting feature points from an entire region and estimating an attitude angle of a camera without forming a mask. It can be seen that a matching image is not properly formed because the attitude angle of the camera is not accurately estimated due to a slope of a ground surface.

FIG. 8C represents an around view image obtained by setting a mask region, extracting feature points, and correcting the attitude angle of the camera according to an embodiment of the present invention. It can be seen that this is a result that is similar to that of FIG. 8B, in which tolerances are corrected in a plane without being affected by the slope of the ground surface.

Figure 9:
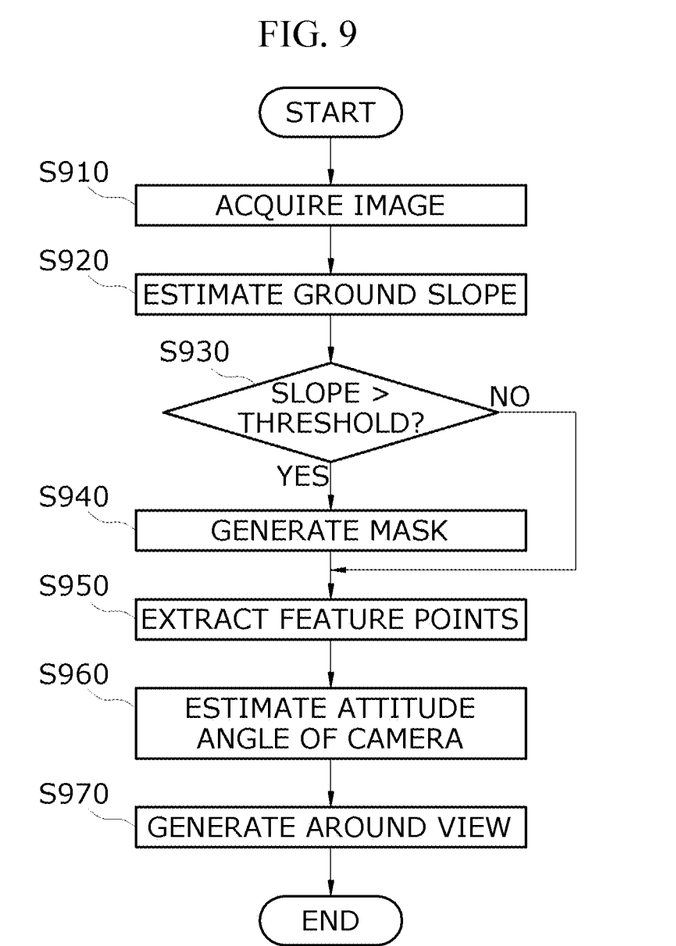
FIG. 9 is a flowchart showing a method of generating an around view according to still another embodiment of the present invention.

FIG. 9 shows a flowchart of an around view generation method according to another embodiment of the present invention.

In order to generate an around view, images are acquired using cameras for performing capturing in four directions, i.e., in front of, behind, to the left side of, and to the right side of, a vehicle (S910).

Before a mask region for extracting feature points from each of the acquired images is generated, whether to generate the mask may be determined by estimating a slope of a ground surface.

When the slope of the ground surface is less than or equal to a certain value, feature points may be extracted from an entire region of each of the acquired images. In this case, feature point extraction performance and matching performance may be better when the feature points are extracted from the entire region than when the mask region is set.

The above-described rotation matrix is used to estimate the slope of the ground surface (S920). That is, when a camera has a known attitude angle that does not need to be corrected, the slope of the ground surface may be calculated using the rotation matrix.

When a rotation matrix indicating the attitude angle of the camera is Tc, a rotation matrix indicating the attitude angle of the camera estimated by ground feature points is Te, and a rotation matrix indicating the slope of the ground surface is Ts, Tc=Ts*Te may be expressed. Accordingly, the slope of the ground surface Ts may be represented as $Ts=Tc*Te^{-1}$ using $Te^{-1}$, which is an inverse matrix of Te.

The slope of the ground surface found using the rotation matrix is compared with a predetermined threshold value (S930). When the slope of the ground surface is less than or equal to the predetermined threshold value, the ground surface is sufficiently flat. Accordingly, the mask is not generated in the image, and the feature points are extracted from the entire region (S950).

Conversely, when the slope of the ground surface exceeds the threshold value, an error may occur in an attitude angle of a camera that is estimated by the feature points. Accordingly, the mask may be generated in the captured image (S940), the feature points may be extracted from only the mask region (S950), and the attitude angle of the camera may be estimated (S960).

A detailed method of setting a mask region and estimating an attitude angle of a camera is as described above.

When the attitude angle of the camera is estimated in this way, it is possible to process the acquired image to generate an around view (S970) and obtain a more accurate around view image in consideration of the ground slope.

According to the present invention, it is possible to accurately extract ground feature points and improve matching of a composite image of an around view monitoring system (AVMS) by estimating an attitude of a camera using the extracted feature points.

Although the configuration of the present invention has been described in detail with reference to the accompanying drawings, the description is merely an example, and it should be appreciated by those skilled in the art that various modifications and changes may be made thereto without departing from the spirit of the present invention. Accordingly, the scope of the present invention is not limited to the above-described embodiments and is determined only by the appended claims.

What is claimed is:

1. An apparatus for generating an around view, the apparatus comprising:
a plurality of cameras configured to capture images in front of, behind, to the left of, and to the right of a vehicle; and
one or more processors configured to:
set a region ranging a predetermined distance from the vehicle in each of the captured images as a mask region,
extract ground feature points from the mask region of each of the captured images,
generate a rotation matrix including a rotation angle of each camera using the extracted feature points, and
rotationally convert the captured images to a top-view image using the rotation matrix,
wherein the one or more processors are configured to detect a traffic line in each of the captured images and set a region between the detected traffic line and the vehicle as the mask region.

2. The apparatus of claim 1, wherein the one or more processors are further configured to generate a virtual traffic line with a predetermined width in each of the captured images when a traffic line is not detected, and set a region between the generated virtual traffic line and the vehicle as the mask region.

3. The apparatus of claim 1, wherein:
the one or more processors are further configured to calculate a slope of a ground surface using a rotation matrix indicating the attitude angle of the camera and a rotation matrix calculated using the feature points extracted from the captured images, the rotation matrices being prestored; and
wherein the one or more processors are configured to set an entirety of each of the captured images as the mask region when the slope of the ground surface is less than or equal to a predetermined threshold value.

4. A method of generating an around view which is performed by an apparatus that includes one or more processors and generates an around view, the method comprising:
acquiring images by performing capturing in four directions, i.e., in front of, behind, to a left side of, and to a right side, of a vehicle using a plurality of cameras;
setting a region ranging a predetermined distance from the vehicle in each of the captured images as a mask region;
extracting ground feature points from the mask region;
generating a rotation matrix including a rotation angle of each camera using the extracted feature points; and
rotationally converting the images captured in the four directions to a top-view image using the rotation matrix,
wherein the setting comprises detecting a traffic line in each of the captured images and setting a region between the detected traffic line and the vehicle as the mask region.

5. The method of claim 4, wherein the setting comprises detecting a traffic line in each of the captured images, generating a virtual traffic line with a predetermined width in each of the captured images when a traffic line is not detected, and setting a region between the generated virtual traffic line and the vehicle as the mask region.

6. A method of generating an around view which is performed by an apparatus that includes one or more processors and generates an around view, the method comprising:
acquiring images by performing capturing in four directions, i.e., in front of, behind, to a left side of, and to a right side, of a vehicle using a plurality of cameras;
setting a region ranging a predetermined distance from the vehicle in each of the acquired images as a mask region;
extracting ground feature points from the mask region;
generating a rotation matrix including a rotation angle of each camera using the extracted feature points; and
rotationally converting the images captured in the four directions to a top-view image using the rotation matrix,
wherein the generating of a rotation matrix comprises calculating a slope of a ground surface using a rotation matrix indicating the attitude angle of the camera and a rotation matrix calculated using the feature points extracted from the captured images, the rotation matrices being prestored; and
wherein the setting comprises setting an entirety of each of the captured images as the mask region when the ground slope is less than or equal to a predetermined threshold value.

* * * * *